(12) United States Patent
Choi et al.

(10) Patent No.: US 11,609,965 B2
(45) Date of Patent: Mar. 21, 2023

(54) METHOD FOR MANAGING A LANDING PAGE AND AN APPARATUS FOR THE SAME

(71) Applicant: Coupang Corp., Seoul (KR)

(72) Inventors: Jin Young Choi, Seoul (KR); Myoung Ho Park, Seoul (KR); Hyung Won Jeon, Seoul (KR); Hyung Gu Kim, Seoul (KR); In Ho Choi, Seoul (KR); Ah Ram Son, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/394,128

(22) Filed: Aug. 4, 2021

(65) Prior Publication Data

US 2022/0327179 A1    Oct. 13, 2022

(30) Foreign Application Priority Data

Apr. 13, 2021    (KR) .......................... 10-2021-0047803

(51) Int. Cl.
| | | |
|---|---|---|
| *G06F 3/00* | (2006.01) | |
| *G06F 16/957* | (2019.01) | |
| *G06F 16/9032* | (2019.01) | |
| *G06F 16/954* | (2019.01) | |

(52) U.S. Cl.
CPC .... *G06F 16/9577* (2019.01); *G06F 16/90324* (2019.01); *G06F 16/954* (2019.01)

(58) Field of Classification Search
CPC .................................................. G06F 16/954
See application file for complete search history.

(56) References Cited

U.S. PATENT DOCUMENTS

| | | | |
|---|---|---|---|
| 8,126,868 B1 * | 2/2012 | Vincent | G06F 16/972 |
| | | | 707/708 |
| 10,534,851 B1 * | 1/2020 | Chan | G06Q 30/0255 |
| 11,282,107 B1 * | 3/2022 | Liu | G06F 16/958 |
| 2010/0042635 A1 * | 2/2010 | Venkataramanujam | |
| | | | G06F 16/958 |
| | | | 715/234 |
| 2014/0129733 A1 * | 5/2014 | Klais | H04L 45/22 |
| | | | 709/239 |

FOREIGN PATENT DOCUMENTS

| | | |
|---|---|---|
| JP | 2012234340 A | 11/2012 |
| KR | 1020120075611 A | 7/2012 |
| KR | 1020130005453 A | 1/2013 |
| KR | 1020130022533 A | 3/2013 |
| KR | 101703919 B1 | 2/2017 |
| KR | 1020170046359 A | 5/2017 |
| KR | 1020190074830 A | 6/2019 |
| KR | 1020200097535 A | 8/2020 |
| KR | 102178229 B1 | 11/2020 |

* cited by examiner

*Primary Examiner* — Thanh T Vu

(74) *Attorney, Agent, or Firm* — Banner & Witcoff, Ltd.

(57) ABSTRACT

Provided is a method of managing a landing page by an electronic apparatus, in which the method includes acquiring first information on a user terminal and second information for the landing page in response to a request for accessing the landing page from the user terminal, generating address information for the landing page based on the first information and the second information, and providing the landing page to the user terminal based on the address information.

10 Claims, 10 Drawing Sheets

FIG. 4

First information on user terminal and second information on landing page ~400a

Target page address information (Fixed)           ~400b
App Scheme:   coupang://product?pId=12345678
PC Web:       https://www.coupang.com/vp/products/12345678
Mobile Web:   https://m.coupang.com/vm/products/12345678

( a )

First information on user terminal and second information on landing page ~401a

Target page address information (Dynamic)   401b        401b
App Scheme:   coupang://product?pId={productId}&vId={vendorId}& ...
PC Web:       https://www.coupang.com/{productId}/{vendorId}?...
Mobile Web:   https://m.coupang.com/vm/products/{productId}/{vendorId} ...
                                              401c        401c
( b )

FIG. 6

| Seq | PageType Group | PageType Key | ModifiedBy | ModifiedAt | Detail |
|---|---|---|---|---|---|
| 85 | FIXED | LIVEFOLLOW | AAA | 2021-02-02 18:15:04 | Detail |
| 84 | FIXED | LIVEHOME | AAA | 2021-02-02 17:00:50 | Detail |
| 77 | FIXED | CPFCHJ1DJN3 | AAA | 2021-01-15 13:18:00 | Detail |
| 76 | FIXED | CPFDJN123 | AAA | 2021-01-12 16:24:54 | Detail |
| 75 | FIXED | CPFY2HD | AAA | 2021-01-12 16:23:40 | Detail |
| 74 | FIXED | CPFYIN3 | AAA | 2021-01-07 17:32:41 | Detail |
| 73 | FIXED | IPHONE | AAA | 2021-01-07 11:39:20 | Detail |
| 72 | FIXED | TRADEIN | BBB | 2020-12-24 12:47:08 | Detail |
| 71 | FIXED | COUPLAY | CCC | 2020-12-30 14:20:42 | Detail |
| ⋮ | | | | | |
| 8 | DYNAMIC | BRAND | DDD | 2019-06-05 16:40:58 | Detail |
| 7 | DYNAMIC | CAMPAIGN | DDD | 2019-06-11 14:16:50 | Detail |
| 6 | DYNAMIC | PROMOTION | DDD | 2019-06-05 16:39:30 | Detail |
| 5 | DYNAMIC | CATEGORY | DDD | 2019-06-11 14:19:11 | Detail |
| 4 | DYNAMIC | TDP | DDD | 2019-06-05 16:37:24 | Detail |
| 3 | DYNAMIC | TSRP | AAA | 2019-11-01 14:03:44 | Detail |
| 2 | DYNAMIC | SRP | EEE | 2019-10-01 16:18:12 | Detail |
| 1 | DYNAMIC | SDP | FFF | 2019-06-04 10:52:38 | Detail |

FIG. 7

| Register Landing Config | | |
|---|---|---|
| Basic | | — 701 |
| Landing Key | [          ] | — 701a |
| Landing Category | [          ] | — 701b |
| Landing Name | [          ] | — 701c |
| Description | [          ] | — 701d |

| Target Page | | | — 702 |
|---|---|---|---|
| Android Platform | [      ∧] | ☐ Use parameter — 702b | |
| IOS Platform | [      ∧] | ☐ Use parameter | |
| Page Key | [        ] | ☐ Use parameter — 702d | |
| ⦿ DYNAMIC  ○ FIXED | — 702e     702c   702a | | |

Fixed PageType Metadata Detail — 900

Basic — 901

Name: AAA

Type: RECRUITING

Description:

Target Page URI Template — 902

PC Web: https://job.coupangcorp.com/xxx/yyy

Mobile Web: https://mobile.coupangcorp.com/job/xxx/yyy

App Scheme: coupang://home

FIG. 10

Fixed PageType Metadata Detail

Basic

Name:
Page key: productId     Data type: NUMERIC
Type: PRODUCT
Description:

Parameters

| Name | Value Type | Delete |
|---|---|---|
| itemId | NUMERIC | ⊖ |
| vendorId | NUMERIC | ⊖ |

+ Add field

Target Page URI Template

PC Web: https://www.coupang.com/vp/products/{pageKey}?itemId={itemId}&vendorItemId={vendorItemId}

Mobile Web: https://m.coupang.com/vm/products/{pageKey}?itemId={itemId}&vendorItemId={vendorItemId}

App Scheme: coupang://product?pId={pageKey}&itemId={itemId}&}&vendorItemId={vendorItemId}

METHOD FOR MANAGING A LANDING PAGE AND AN APPARATUS FOR THE SAME

RELATED APPLICATION INFORMATION:

The present application claims priority to and the benefit of Korean Patent Application No. 10-2021-0047803 filed on Apr. 13, 2021, and is incorporated by reference herein in its entirety.

TECHNICAL FIELD

The present disclosure relates to a method of managing a landing page and an apparatus for managing the same, and more particularly, to a method of managing settings related to a landing page so that a user may move to a specific page, that is, a landing page, through an advertisement or the like.

DESCRIPTION OF THE RELATED ART

The present disclosure relates to a method of setting an advertisement landing page, a method of providing an advertisement, and a computer program. Advertisements may include various types of advertisements, such as display advertisements, affiliate advertisements, and keyword advertisements. For example, the keyword advertisement is an advertisement area in which, when advertisers (or advertising agencies) register keywords capable of advertising their web sites, companies, or products in search engine sites and general users who want to search input search words in a search word input window and then perform a search, advertisements of advertisers who have purchased keywords corresponding to the search words are exposed as search results.

Related Document: Korean Patent No. 10-1703919

Meanwhile, in managing landing pages, managing settings for details of all the landing pages may not only lay a burden on administrators but may also provide users with unrelated pages due to incorrect settings. In addition, even when address formats of specific types of pages are collectively changed, the administrators need to change information on all target addresses corresponding to specific types of pages which may be inconvenient and may provide incorrect pages to users. In particular, when pages are provided to users to run on the same platform despite terminal devices with different operating systems, pages that are not optimized may be provided to the users, thereby hindering information delivery and advertising effects.

DISCLOSURE OF THE INVENTION

An aspect provides a method of managing a landing page and an apparatus for managing a landing page. Specifically, the method of managing a landing page is to provide a page optimized for an environment of a terminal device by confirming an environment or the like of a user terminal device.

According to an aspect, there is provided a method of managing a landing page by an electronic apparatus, in which the method includes acquiring first information on a user terminal and second information on a landing page in response to a request for accessing the landing page from the user terminal, generating address information for the landing page based on the first information and the second information, and providing the landing page to the user terminal based on the address information. Here, the address information is variably generated according to the first information.

The first information may include information on an operating system of the user terminal, and the address information may be variably generated according to the operating system of the user terminal.

The generating may include confirming the information on the operating system, confirming a platform corresponding to the operation system, and generating the address information for the landing page corresponding to the confirmed platform.

The generating may further include confirming a target address template corresponding to the confirmed platform and generating the address information for the landing page according to a format of the target address template.

The first information may include information representing whether a specific application is installed in the user terminal, and the address information may be variably generated according to whether the specific application is installed.

The generating may include generating the address information by mapping a parameter included in the second information to the target address template when the format of the target address template is dynamically set.

The platform may be one of a first platform representing a web platform, a second platform representing an application platform or an application store, or a third platform representing an application platform or a web platform.

The generating may include confirming an identifier related to the parameter in the target address template and replacing the identifier related to the parameter with a value of the parameter.

When a setting related to a use of the parameter is enabled, the address information may include a value of the parameter and a name of the parameter.

The method may further include collecting an action of the user terminal accessing the landing page based on the first information and the second information and providing information on the collected action according to a preset criterion.

According to example embodiments, it is possible for an electronic apparatus according to some example embodiments to provide a user's desired page by adapting to a driving environment of a user terminal device. In addition, according to an aspect, it is possible for an electronic apparatus according to some example embodiments to provide an advertisement target page optimized for an environment to a user by an advertisement, and thus a target to be advertised can be optimized and provided to a user terminal device, thereby enhancing the effect of the advertisement.

In addition, according to example embodiments, it is possible to allow an electronic apparatus according to some example embodiments to present pages optimized for operating systems and platforms of user terminal devices even in a situation in which the pages are developed differently for each operating system or platform.

In addition, according to example embodiments, it is possible for the electronic apparatus according to some example embodiments to allow an administrator to set a dynamic template address for a landing page, and thus the administrator can provide a systematic landing page to a user without separately setting details of the landing page.

Furthermore, according to example embodiments, it is possible for an electronic apparatus according to some example embodiments to allow an administrator to grasp how effective advertisements in action are for consumers at a glance. In addition, according to an aspect, it is possible for an electronic apparatus according to some example embodiments to record a time for which a user stays on a specific landing page and provide the time to an administrator, thereby allowing an administrator to grasp at a glance whether there is a problem with a landing page and which landing page is effective for consumers.

BRIEF DESCRIPTION OF THE DRAWING

FIG. 4 is a diagram illustrating fixed template address information and dynamic template address information according to example embodiments.

FIG. 6 is a diagram of a user interface (UI) for setting and managing a landing page according to example embodiments.

FIG. 7 is a diagram illustrating an example of a UI of a second page for setting details of a landing page according to example embodiments.

FIG. 9 is a diagram illustrating an example of a UI of a second page for setting details of a landing page according to example embodiments.

FIG. 10 is a diagram illustrating an example of a UI of a second page for setting details of a landing page according to example embodiments.

DETAILED DESCRIPTION OF THE INVENTION

Figure 1:
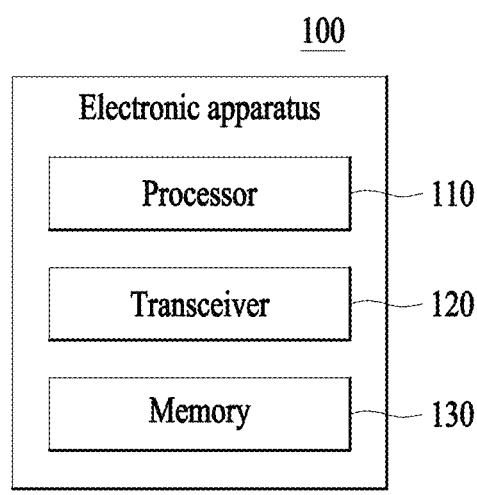
FIG. 1 is a diagram of an example of internal components of an electronic apparatus according to example embodiments.

Hereinafter, example embodiments of the present disclosure will be described in detail with reference to the drawings.

In describing some example embodiments, descriptions of technical contents that are well known in the technical field to which the present disclosure pertains and are not directly related to the present disclosure will be omitted. This is to more clearly convey the gist of the present disclosure without ambiguity by omitting unnecessary descriptions.

For the same reason, some components in the accompanying drawings are exaggerated, omitted, or schematically illustrated. In addition, the size of each component does not entirely reflect the actual size. The same reference numerals are assigned to the same or corresponding components in each drawing.

Various advantages and features of the present disclosure and methods accomplishing them will become apparent from example embodiments to be described in detail below with reference to the accompanying drawings. However, the present disclosure is not limited to example embodiments to be described below but may be implemented in various different forms. These example embodiments will be provided only in order to make the present disclosure complete and allow those skilled in the art to completely recognize the scope of the present disclosure, and the present disclosure will be defined by the scope of the claims. Throughout the specification, like reference numerals denote like components.

In this case, it will be appreciated that each block of a processing flowchart and combinations of the flowcharts may be executed by computer program instructions. Since these computer program instructions may be mounted in a processor of a general computer, a special computer, or other programmable data processing apparatuses, these computer program instructions executed through the process of the computer or the other programmable data processing apparatuses create means performing functions described in the block(s) of the flowchart. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in the block(s) of the flowchart. Since the computer program instructions may also be mounted on the computer or the other programmable data processing apparatuses, the instructions performing a series of operation operations on the computer or the other programmable data processing apparatuses to create processes executed by the computer, thereby executing the computer or the other programmable data processing apparatuses, may also provide operations for performing the functions described in the block(s) of the flowchart.

In addition, each block may indicate some of modules, segments, or codes including one or more executable instructions for executing a specific logical function (s). Further, it is to be noted that functions mentioned in the blocks occur regardless of a sequence in some alternative example embodiments. For example, two blocks that are continuously shown may actually be simultaneously performed or may be performed in a reverse sequence depending on corresponding functions.

In this case, the term "-unit" used in this example embodiment refers to software or hardware components such as field-programmable gate array (FPGA) or application-specific integrated circuit (ASIC), and the "-unit" performs certain roles. However, "-unit" is not limited to the software or the hardware. "-unit" may be configured to be stored in a storage medium that can be addressed or may be configured to regenerate one or more processors. Therefore, as an example, "-unit" includes components such as software components, object-oriented software components, class components and task components, processes, functions, attributes, procedures, subroutines, segments of a program code, drivers, firmware, a microcode, a circuit, data, a database, data structures, tables, arrays, and variables. Components and functions provided within "-units" may be combined with a smaller number of components and "-units" or be separated from additional components and "-units." In addition, components and "-units" may be implemented to reproduce one or more central processing units (CPUs) in a device or a security multimedia card.

FIG. 1 is a diagram of an example of internal components of an electronic apparatus according to example embodiments.

Referring to FIG. 1, internal components of the electronic apparatus 100 are not limited only to the illustrated components. The electronic apparatus 100 may include at least one of a processor 110, a transceiver 120, and a memory 130.

The processor 110 may process a series of operations for performing a method of managing a landing page according to various example embodiments of the present disclosure. The processor 110 may control other components of the electronic apparatus 100. Meanwhile, in an example embodiment, a product may be used as a term referring to a specific item, and an item may be sold to a user in a service related to the electronic apparatus 100.

The processor 110 may confirm detailed information on the first product in response to a request for the first product through a first page. The processor 110 may execute at least one program to obtain first information on a user terminal and second information for a landing page in response to a request for accessing the landing page from a user terminal; generate address information for the landing page based on the first information and the second information; and provide the landing page to a user terminal based on the address information. Programs or computer-readable instructions executed by the processor 110 may be stored in advance in the memory 130 or may be externally received through the transceiver 120. The processor 110 may provide the first page to a display of the electronic apparatus 100.

The transceiver 120 may perform a function of transmitting information stored in the memory 130 of the electronic apparatus 100 or information processed by the processor 110 to another device or a function of receiving information from another device by the electronic apparatus 100.

The memory 130 has a structure implemented in a predetermined storage space of the electronic apparatus 100 and may include a database in which functions such as storing, searching, deleting, editing, or adding data may be freely performed. For example, the memory 130 may include fields or components for processing functions such as storing, searching, deleting, editing, or adding data. The memory 130 may store data related to an information providing method to be performed by the electronic apparatus 100. For example, the memory 130 may store instructions or data for an execution operation of the processor 110. The memory 130 according to some example embodiments may include a database for storing information on items and the like.

The electronic apparatus 100 according to some example embodiments may perform a method of managing a landing page according to example embodiments described below. The electronic apparatus 100 may be referred to as, for example, an apparatus for managing a landing page.

In addition, an interface described in this specification may include a hardware configuration for receiving an input signal from a user or may be variously interpreted as an icon, a widget, a button, a slide bar, a progress bar, a touch area, a widget (for example, a text area or the like) capable of receiving text, a check box, and the like which are implemented in software. In addition, an advertisement described below may include various types of advertisements, such as a display advertisement, an affiliate advertisement, and a keyword advertisement.

Figure 2:
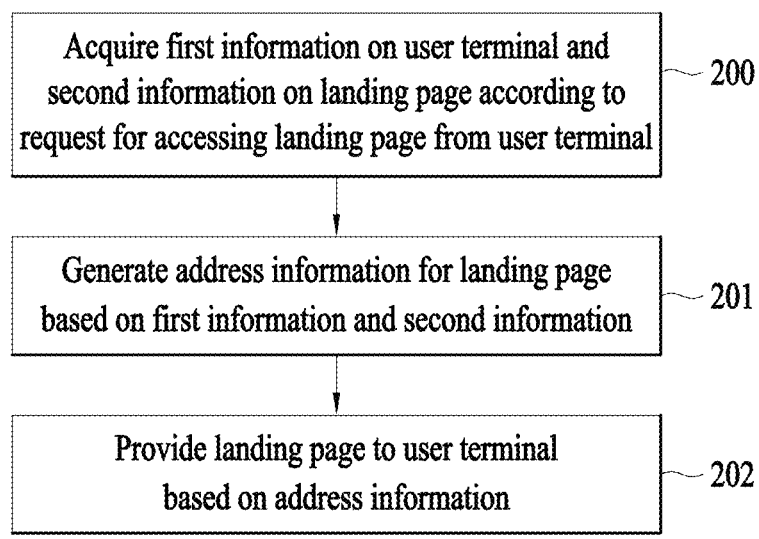
FIG. 2 is a flowchart illustrating an operation of an apparatus for managing a landing page according to example embodiments.

FIG. 2 is a flowchart illustrating an operation of an apparatus for managing a landing page according to example embodiments.

The apparatus for managing a landing page according to some example embodiments may refer to the electronic apparatus 100 illustrated in FIG. 1. The apparatus for managing a landing page according to some example embodiments performs a method of managing a landing page according to example embodiments. The method of managing a landing page according to some example embodiments may be performed, for example, by the processor 110 of FIG. 1.

The electronic apparatus according to some example embodiments may receive a request for accessing a specific page from a user terminal device or an advertisement server. The electronic apparatus may provide a specific page to a user terminal device in response to the request for accessing the specific page. However, when the electronic apparatus simply provides only the corresponding page to a user without considering the environment of the user terminal, it is difficult to provide a page suitable for the environment of the user terminal. In addition, in order to provide an optimized service to the user, the electronic apparatus according to some example embodiments needs to adaptively provide a page according to an operating system or an execution platform of the user terminal device. Therefore, when receiving the request for accessing the specific page from the user terminal device or the advertisement server, the electronic apparatus according to some example embodiments may provide the page suitable for the user terminal device, that is, the landing page based on information on the user terminal device and information for the landing page. That is, the landing page may be variably changed and provided to the user according to the environment of the user terminal device or the information for the landing page to be provided. For example, the address information for the landing page according to some example embodiments may be variably generated according to the operating system of the user terminal.

As an example embodiment, the method of managing a landing page according to some example embodiments may perform at least one of operations 200 to 202 illustrated in FIG. 2.

Referring to operation 200, the electronic apparatus according to some example embodiments may acquire first information on the user terminal and second information for the landing page in response to a request for accessing a landing page from the user terminal.

The landing page refers to a page provided to the user terminal device by the electronic apparatus according to some example embodiments. The landing page may be variably changed according to the environment of the user terminal device and provided to the user. At least one of the first information and the second information according to some example embodiments may be included in the request for accessing the landing page from the user terminal.

The first information on the user terminal may include, for example, information on the operating system of the user terminal device and information related to the setting of the user terminal device. The operating system of the user terminal device may be, for example, at least one of an Android operating system and an iPhone operating system (iOS) which are applied to a user mobile terminal device. Furthermore, the first information according to some example embodiments may include information representing whether a specific application is installed in the user terminal.

The information related to the setting of the user terminal device may include information representing a platform (for example, a type of web browser) on which the user terminal device runs a web page. In addition, the information related to the setting of the user terminal device may include information representing whether a specific application (for example, an application for running a first page according to some example embodiments) is installed in the user terminal device.

The platform according to some example embodiments may include a web platform, an application platform, and a platform representing an application store.

The second information for the landing page may be information necessary for the electronic apparatus according to some example embodiments to confirm or generate the landing page. The second information for the landing page may be, for example, a uniform resource locator (URL) received from the user terminal device or the advertisement server.

The second information for the landing page may include one or more parameters. The parameter may mean, for example, a variable including a value necessary for the electronic apparatus according to some example embodiments to call a landing page. For example, when the landing page is a detail page of a specific item, the second information for the landing page may include an item identifier or the like for the specific item as a parameter. For example, when the landing page is a page representing an announcement for employment information, the second information for the landing page may include an identifier or the like for a post including the corresponding announcement as a parameter.

Referring to operation 200, the electronic apparatus according to some example embodiments may generate address information for the landing page based on the first information and the second information.

The electronic apparatus according to some example embodiments generates the address information for the landing page to be provided to a user. The address information may be a URL that may call the landing page.

For example, the electronic apparatus may confirm template address information for generating the address information for the landing page by using the first information according to some example embodiments. The template information may be the address information for the landing page itself or a template that is a basis for generating the address information for the landing page. The template information may be variously referred to as a target address template, a target page address template, a target page URL, and the like.

For example, the address information for the landing page according to some example embodiments may be variably generated according to the operating system of the user terminal. That is, the template address information may be variably set or generated according to the operating system of the user terminal.

The electronic apparatus may generate an address for the completed landing page by mapping the second information (or one or more parameters according to example embodiments) according to some example embodiments to some pieces of the confirmed template information.

In some example embodiments, the electronic apparatus may include a database for searching for the corresponding landing page using at least one of the first information and the second information. That is, the database according to some example embodiments may be configured to output the address information for the landing page or the template information according to some example embodiments when a query is received under conditions of the first information or the second information.

The first information according to some example embodiments may include the information representing whether a specific application is installed in the user terminal. Accordingly, the address information for the landing page according to some example embodiments may be variably generated according to whether the specific application is installed. For example, when the specific application is not installed in the user terminal, the address information for the landing page according to some example embodiments may provide a user with address information for a landing page running on the web platform or run an application store, in which an application may be installed, on a user terminal device. That is, the address information for the landing page according to some example embodiments may be variably generated according to whether the specific application is installed.

Referring to operation 202, the electronic apparatus according to some example embodiments may provide a landing page to the user terminal based on the address information for the landing page.

To generate the landing page, the electronic apparatus according to some example embodiments may be set by an administrator. The administrator may set to generate an address for an appropriate landing page in response to a value of the first information or the second information from the user terminal device. For example, the administrator may set the first template information to be used on the landing page when confirming that the operating system of the user terminal device is an Android operating system based on the first information received by the electronic apparatus. For example, the administrator may set a parameter received as the second information received by the electronic apparatus to be mapped to a specific location in the template information for the landing page. For example, the administrator may set information running on a web browser platform to be transmitted to the user terminal device when confirming that the operating system of the user terminal device is the Android operating system based on the first information received by the electronic apparatus. The administrator may modify or add the template information for the landing page and may set platforms for running the landing page for each operating system.

The electronic apparatus according to some example embodiments may provide a user's desired page by adapting to the driving environment of the user terminal device due to this operation. In addition, the electronic apparatus according to some example embodiments may provide an advertisement target page optimized for environment to a user, and thus a target to be advertised may be optimized and provided to the user terminal device, thereby enhancing the effect of advertisement.

In addition, due to the above operation, the electronic apparatus according to some example embodiments may present pages optimized for the operating systems and platforms of the user terminal devices even in a situation in which the pages are developed differently for each operating system or platform.

Furthermore, the electronic apparatus according to some example embodiments may collect actions of the user terminal accessing the landing page based on the first information and the second information and provide information on the collected actions according to preset criteria.

The electronic apparatus according to some example embodiments may collect actions of the accessed user terminal device when the user terminal device accesses the landing page. For example, when the landing page is a product detail page that presents detailed information on a specific item and a user clicks an icon to purchase the item on the product detail page, the electronic apparatus according to some example embodiments may record that the purchase procedure of the corresponding item is processed by the corresponding user. Also, for example, when a user leaves (terminates) a product detail page within a specific time (for example, 10 seconds or the like), a time for which the user stays on the page may be recorded. The electronic apparatus according to some example embodiments may collect actions of the user terminal device according to some example embodiments for each landing page and may provide the collected results. The collected result according to some example embodiments may be expressed as a tracking code.

Due to the operation, the electronic apparatus according to some example embodiments may allow an administrator to grasp how effective advertisements in action are for consumers at a glance. In addition, the electronic apparatus according to some example embodiments may record a time for which a user stays on a specific landing page and provide the time to an administrator, thereby allowing an administrator to grasp at a glance whether there is a problem with the landing page and which landing page is effective for consumers.

Figure 3:
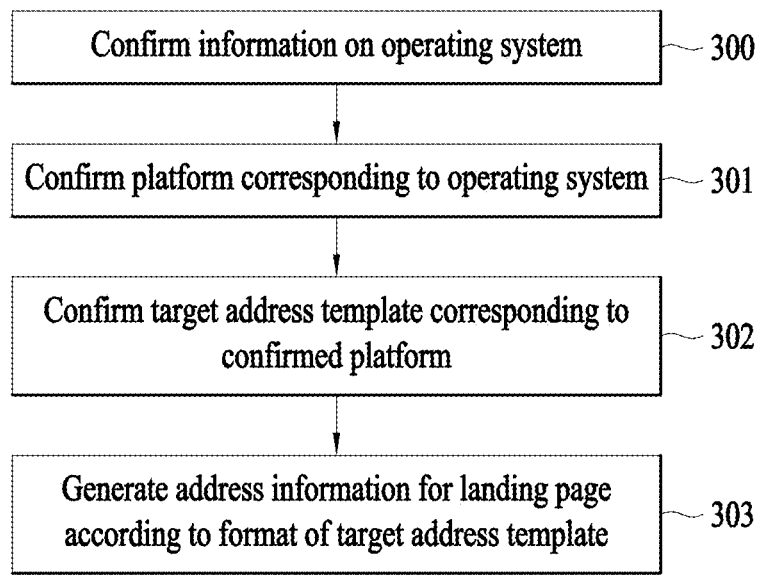
FIG. 3 is a flowchart illustrating another example of the apparatus for managing a landing page according to example embodiments.

FIG. 3 is a flowchart illustrating another example of the apparatus for managing a landing page according to example embodiments.

The apparatus for managing a landing page according to some example embodiments may refer to the electronic apparatus illustrated in FIGS. 1 and 2. As an example embodiment, the method of managing a landing page according to some example embodiments may perform at least one of operations 300 to 303 illustrated in FIG. 3.

Specifically, FIG. 3 is the flowchart illustrating the operation of the electronic apparatus according to some example embodiments to variably generate address information for a landing page according to a platform corresponding to an operating system of a user terminal device. For example, the address information for the landing page according to some example embodiments may be variably generated according to the operating system of the user terminal. That is, the template address information may be variably set or generated according to the operating system of the user terminal.

Referring to operation 300, the electronic apparatus according to some example embodiments may confirm information on the operating system of the user terminal. The information on the operating system may be information included in the first information of FIG. 2. Operation 300 may be performed, for example, in operation 200 of FIG. 2.

Referring to operation 301, the electronic apparatus according to some example embodiments may confirm a platform corresponding to the operating system by using the information on the operating system confirmed in operation 300. The platform for the operating system may be set by an administrator or a system. In an example embodiment, the electronic apparatus may confirm platform information for running the landing page from the operating system of the user terminal device and the second information on the received landing page. Operation 302 may be performed, for example, in operation 200 of FIG. 2.

Referring to operation 302, the electronic apparatus according to some example embodiments may confirm a target address template (template address information) corresponding to the confirmed platform. The target address template corresponding to the confirmed platform may be set by the administrator or system. Operation 302 may be performed, for example, in operation 200 of FIG. 2.

Referring to operation 303, the electronic apparatus according to some example embodiments may generate address information for a landing page according to a format of a target address template. The address information for the landing page may be, for example, the confirmed template information itself, or an address for the completed landing page may be generated by mapping one or more parameters according to example embodiments to some pieces of the confirmed template information. Operation 303 may be performed, for example, in operation 201 of FIG. 2.

The electronic apparatus according to some example embodiments may provide a user's desired page by adapting to the driving environment of the user terminal device due to this operation. In addition, the electronic apparatus according to some example embodiments may provide an advertisement target page optimized for environment to a user, and thus a target to be advertised may be optimized and provided to the user terminal device, thereby enhancing the effect of advertisement.

In addition, due to the above operation, the electronic apparatus according to some example embodiments may present pages optimized for the operating systems and platforms of the user terminal devices even in a situation in which the pages are developed differently for each operating system or platform.

In addition, according to an aspect, it is possible for the electronic apparatus according to some example embodiments to allow an administrator to set a dynamic template address for a landing page, and thus the administrator may provide a systematic landing page to a user without separately setting details of the landing page.

FIG. 4 is a diagram illustrating fixed template address information and dynamic template address information according to example embodiments.

Specifically, (a) of FIG. 4 shows an operation of generating address information for a landing page according to some example embodiments by allowing the electronic apparatus according to some example embodiments to use fixed template address information. (b) of FIG. 4 shows an operation of generating address information for a landing page according to some example embodiments by allowing the electronic apparatus according to some example embodiments to use the dynamic template address information.

Referring to (a) of FIG. 4, the electronic apparatus according to some example embodiments receives a request for a specific page from a user terminal device or an advertisement server. The electronic apparatus according to some example embodiments may obtain first information on a user terminal and second information for a landing page in response to the request for the specific page (400a).

The electronic apparatus according to some example embodiments may further receive the first information on the user terminal device and the second information for the landing page. The second information according to some example embodiments may be included in the request for the specific page (400a) or may include address information for calling the specific page described above.

The electronic apparatus according to some example embodiments may inquire the template address information (400b) according to some example embodiments by using the first information and the address information for calling the specific page described above. For example, when an administrator sets a landing page in the form of a PC web to be provided to a user when the operating system of the user terminal device is an Android operating system, the electronic apparatus according to some example embodiments may determine that "https://www.coupang.com/vp/products/12345678" is an address for the landing page and provide the landing page to the user using the address. For example, when the administrator sets the landing page in the form of an application to be provided to a user when the operating system of the user terminal device is an iOS (App Scheme), the electronic apparatus according to some example embodiments may determine that "coupang://product?pId=12345678" is an address for a landing page in the form of a mobile web and provide the landing page to a user using this address. That is, the address information for the landing page according to some example embodiments may be variably generated according to the operating system of the user terminal. That is, the template address information may be variably set or generated according to the operating system of the user terminal.

Here, the template address information according to some example embodiments may be set to a fixed value. That is, in the fixed template address information, the address for the landing page may be the template address information itself.

Meanwhile, the administrator separately sets all the landing pages to correspond to the first information according to some example embodiments, which may not only lay a burden on the administrator but also provide an unrelated page to a user due to incorrect settings. In addition, even when address formats of specific types of pages are collectively changed, the administrators need to change information on all target addresses corresponding to the specific types of pages, which may be inconvenient and provide incorrect pages to users. For example, all the remaining pieces of the address information for the landing page for providing the detail page of the item may be the same except for identification information on an item. In this case, the electronic apparatus according to some example embodiments may generate an address for the landing page using dynamically set template address information.

Therefore, referring to (b) of FIG. 4, the electronic apparatus according to some example embodiments receives a request for a specific page from a user terminal device or an advertisement server (401a). The electronic apparatus according to some example embodiments may obtain first information on the user terminal and second information for a landing page in response to the request for the specific page (400a). Here, the second information according to some example embodiments may include one or more parameters.

The electronic apparatus according to some example embodiments may inquire the template address information according to some example embodiments by using the first information and the address information for calling the specific page described above. For example, when an administrator sets a landing page in the form of a PC web to be provided to a user when the operating system of the user terminal device is an Android operating system, the electronic apparatus according to example embodiments may determine that "https://www.coupang.com/{productId}/{vendorId}? . . . " is an address for the landing page and provide the landing page to the user using the address. For example, when an administrator sets the landing page in the form of an application to be provided to the user when the operating system of the user terminal device is an iOS (App Scheme), the electronic apparatus according to example embodiments may determine that "coupang://product?pId={productId}&vId=vendorId & . . . " is an address for the landing page in the form of a mobile web and provide the landing page to the user using this address. That is, the address information for the landing page according to some example embodiments may be variably generated according to the operating system of the user terminal. That is, the template address information may be variably set or generated according to the operating system of the user terminal.

Here, the template address information according to some example embodiments may be set in a dynamic form as illustrated in (b) of FIG. 4. That is, the template address information in the dynamic form itself may not be address information for requesting a landing page but may be a template in which address information in a completed form may be generated when other parameters are combined.

The electronic apparatus according to some example embodiments confirms areas to be substituted with parameters in the template address information in the dynamic form. For example, the areas to be substituted with the parameters may be identified by parentheses, curly brackets, square brackets, a preset mapping identifier, or the like within the template address information. Referring to (b) of FIG. 4, the areas to be substituted with the parameters in the template address information are represented by the curly brackets, and a name of the parameter is represented within the curly brackets. That is, the template address information in the dynamic form includes the name of the parameter to be substituted in the second information according to some example embodiments and a mapping identifier (curly bracket) for the parameter.

The electronic apparatus according to some example embodiments confirms the areas to be identified with the parameter and then maps and substitutes the parameter(s) included in the second information to the corresponding areas.

According to example embodiments, the parameter may be substituted in an area corresponding to a base URL in address information for a landing page, such as an area 401c. In addition, the parameter may be divided and included into other special characters (for example, ? and &) as a query area following the base URL as illustrated in an area 401b. In the parameter to be substituted in the address information for the landing page according to example embodiments, only a value of the parameter (the area 401c) may be substituted and displayed, or the value of the parameter and the name of the parameter may be displayed in combination (the area 401b).

Due to the above operation, the electronic apparatus according to some example embodiments may present pages optimized for the operating systems and platforms of the user terminal devices even in a situation in which the pages are developed differently for each operating system or platform.

In addition, according to an aspect, it is possible for the electronic apparatus according to some example embodiments to allow an administrator to set a dynamic template address for a landing page, and thus the administrator may provide a systematic landing page to a user without separately setting details of the landing page.

Figure 5:
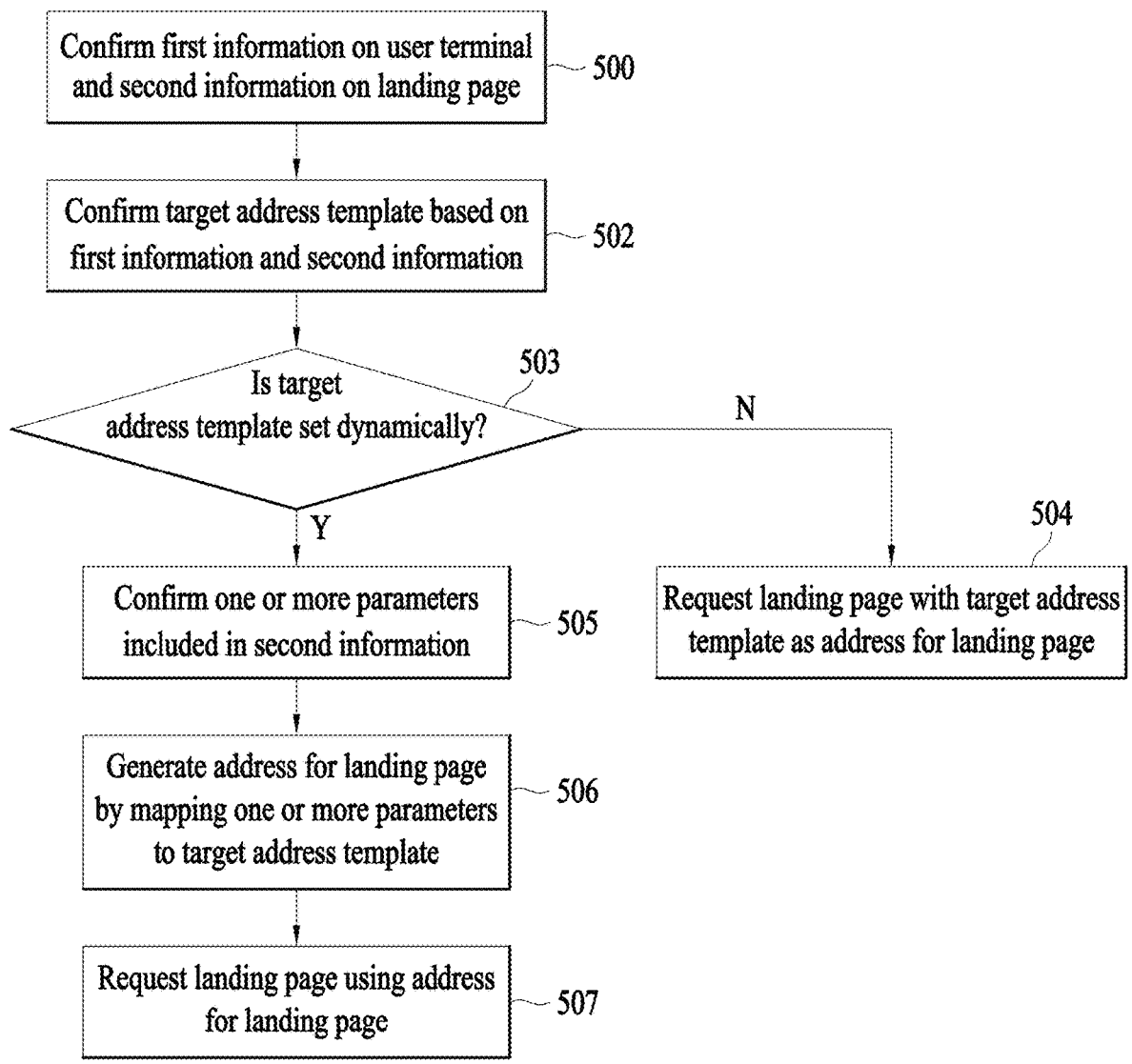
FIG. 5 is a flowchart illustrating another example of a method of managing a landing page according to example embodiments.

FIG. 5 is a flowchart illustrating another example of a method of managing a landing page according to example embodiments.

The apparatus for managing a landing page according to some example embodiments may refer to the electronic apparatus illustrated in FIGS. 1 to 4. As an example embodiment, the method of managing a landing page according to some example embodiments may perform at least one of operations 500 to 507 illustrated in FIG. 5.

Specifically, FIG. 5 is the flowchart of operations performed by an electronic apparatus according to some example embodiments when template information (target address template) on a landing page according to some example embodiments is set to be fixed or dynamic.

Referring to operations 500 and 501 of FIG. 5, the electronic apparatus according to some example embodiments may confirm first information on a user terminal and second information for a landing page and determine a target address based on the first information and the second information. Operation 500 may include operation 200 of FIG. 2 and operations 300 and 301 of FIG. 3. Operation 501 may include operation 201 of FIG. 2 and operation 302 of FIG. 3.

Referring to operation 503, the electronic apparatus according to some example embodiments may confirm whether the confirmed target address template is set to be dynamic or fixed.

The dynamically set target address template may include, for example, a mapping identifier capable of mapping one or more parameters to address information for requesting a landing page. For example, the target address template may include one or more mapping identifiers. The mapping identifier may be expressed by, for example, curly brackets, square brackets, special characters, and the like. Meanwhile, the fixedly set target address template may be, for example, address information itself for requesting a landing page.

When the confirmed target address template is set to be fixed, the electronic apparatus according to some example embodiments may perform operation 504. Referring to operation 504, the electronic apparatus according to some example embodiments requests the landing page with a target address template as an address for the landing page. Operations 505 to 507 may perform some or all of the operations illustrated in (a) of FIG. 4.

When the confirmed target address template is set to be dynamic, the electronic apparatus according to some example embodiments may perform at least one of operations 505 to 507.

Referring to operations 505 to 507, the electronic apparatus according to some example embodiments confirms one or more parameters included in the second information, maps one or more parameters to the target address template to generate an address for the landing page, and provides the landing page to the user by using the address of the landing page. Operations 505 to 507 may perform some or all of the operations illustrated in (b) of FIG. 4.

The electronic apparatus according to some example embodiments may collect actions of the accessed user terminal device when the user terminal device accesses the landing page. For example, when the landing page is a product detail page that presents detailed information on a specific item and a user clicks an icon to purchase the item on the product detail page, the electronic apparatus according to some example embodiments may record that the purchase procedure of the corresponding item is processed by the corresponding user. Also, for example, when a user leaves (terminates) a product detail page within a specific time (for example, 10 seconds or the like), a time for which the user stays on the page may be recorded. The electronic apparatus according to some example embodiments may collect actions of the user terminal device according to some example embodiments for each landing page and may provide the collected results.

Due to the operation, the electronic apparatus according to some example embodiments may allow an administrator to grasp how effective advertisements in action are for consumers at a glance. In addition, the electronic apparatus according to some example embodiments may record a time for which a user stays on a specific landing page and provide the time to an administrator, thereby allowing an administrator to grasp at a glance whether there is a problem with the landing page and which landing page is effective for consumers.

FIG. 6 is a diagram of a user interface (UI) for setting and managing a landing page according to example embodiments.

Specifically, FIG. 6 is an example of a UI of a management page 600 representing a landing page and information related to the landing page in order for an administrator to manage the landing page according to some example embodiments.

The management page 600 according to some example embodiments is a page that allows an administrator who sets the landing page to be accessed and a page that is set to provide a specific page suitable for a user by using first information and second information acquired from a user terminal device. The management page 600 may display settings for each landing page in the form of a table so that settings for each landing page may be set.

The table shown in the management page 600 may include a first column 601 for representing a type (that is, whether the landing page is template address information of a fixed type or template address information of a dynamic type) of template address information for the landing page according to some example embodiments, a second column 602 for representing a type of landing page to be provided to a user, a third column 603 for representing the last modified or set date by an administrator, and a fourth column 604 including a first interface for providing detailed settings for the settings of the landing page. The type of landing page may mean, for example, classification of pages set by an administrator.

For example, the electronic apparatus according to some example embodiments acquires the first information and the second information according to some example embodiments. The electronic apparatus may confirm a template address according to some example embodiments by inquiring a row matching the acquired second information. For example, the electronic apparatus may compare the values shown in the column 601 representing the type of page included in the second information and the values shown in the detailed information (the third column 603) related to the page to search for and confirm the template address according to some example embodiments. The electronic apparatus according to some example embodiments may confirm the template address and then confirm whether the corresponding template address information is in the dynamic form or the fixed form (by confirming the column 601). In the case of the template address information of the fixed type, the electronic apparatus according to some example embodiments may confirm the corresponding landing address information based on the first information according to some example embodiments and use the address information for the corresponding landing page to provide a page to a user. In the case of the template address information of the fixed type, the electronic apparatus according to some example embodiments may confirm the corresponding landing address information based on the first information according to some example embodiments and use the address information for the corresponding landing page to provide a page to a user.

According to example embodiments, when an administrator clicks the first interface (the fourth column 604), the electronic apparatus provides a second page for setting details of the corresponding landing page.

Due to the above operation, the electronic apparatus according to some example embodiments may present pages optimized for the operating systems and platforms of the user terminal devices even in a situation in which the pages are developed differently for each operating system or platform.

In addition, according to an aspect, it is possible for the electronic apparatus according to some example embodiments to allow an administrator to set a dynamic template address for a landing page, and thus the administrator may provide a systematic landing page to a user without separately setting details of the landing page.

FIG. 7 is a diagram illustrating another example of a UI of a second page for setting details of a landing page according to example embodiments.

Specifically, FIG. 7 illustrates a second page 700 set to generate address information for a landing page using first information and second information acquired from a user terminal device. The second page 700 according to some example embodiments may refer to the second page of FIG. 6.

The second page 700 according to some example embodiments may include a first area 701 for setting basic matters of the landing page and a second area 702 for setting necessary for generating an address for the landing page.

The first area 701 according to some example embodiments may include a second interface 701a for setting a key of a page that may identify a landing page, a third interface 701b for setting a category of the landing page, a fourth interface 701c for setting a name of the landing page, and a fifth interface 701d for setting detailed description of the landing page. The second to fifth interfaces 701a to 701d according to some example embodiments may be interfaces (for example, text areas) through which text or a character string may be received from an administrator.

The second area 702 according to some example embodiments may include a sixth interface 702a for setting a running platform of pages for each operating system of a user terminal device, and a seventh interface 702b for representing whether to transmit information representing the operating system of the user terminal device as a parameter in the address for the landing page according to some example embodiments. The sixth interface 702a may be, for example, a widget capable of selecting one of a plurality of options. The seventh interface 702b may be, for example, a check box, a button, or an icon that may be set to be enabled or disabled.

The seventh interface 702b according to some example embodiments is a setting related to the use of the parameter(s) and is an interface for setting the parameter to be included as a part for transmitting a query within address information for the landing page according to some example embodiments. The seventh interface 702b may be referred to as a use parameter interface.

That is, when the seventh interface 702b according to some example embodiments is enabled, the address information for the landing page according to some example embodiments may include both a value of the parameter and the name of the parameter in the area including the parameter in the address information. In addition, when the seventh interface 702b according to some example embodiments is disabled, the address information for the landing page according to some example embodiments may include only the value of the parameter in the area including the parameter in the address information.

That is, the electronic apparatus confirms the template address information corresponding to the web platform, generates the address information for the landing page using the template address information, and provides the landing page based on the generated address information.

For example, the second area 702 may include an interface for setting information on a platform to be provided to a user when the operating system of the user terminal device is an iOS, and an interface for setting information on the platform to be provided to the user when the operating system of the user terminal device is an Android operating system. Further, the second area 702 may include an interface for selecting whether to transmit the operating system of the user terminal to the address information for the landing page as a parameter when the operating system of the user terminal device is the iOS.

The platform that may be set herein may be one of a first platform representing a web platform, a second platform representing an application platform or an application store, or a third platform representing an application platform or a web platform.

The running platform that may be set herein may be one of a first platform representing a web platform, a second platform representing an application platform or an application store, or a third platform representing an application platform or a web platform. That is, the electronic apparatus confirms the template address information corresponding to the web platform, generates the address information for the landing page using the template address information, and provides the landing page based on the generated address information.

For example, when the corresponding landing page is set to run on a second platform, the electronic apparatus according to some example embodiments may provide a landing page run by a platform of a specific application to a user or may allow a user terminal device to run an application store. For example, when the specific application is installed in the user terminal device, the electronic apparatus may provide the user with a landing page running on the platform for the specific application. For example, when the specific application is not installed in the user terminal device, the electronic apparatus may allow the user terminal device to run the application store. Here, whether the specific application is installed in the user terminal device may be signaled through the second information. That is, the electronic apparatus may confirm whether the specific application is installed from the acquired second information, provide the landing page running on the platform for the specific application to the user, or allow the user terminal device to run the application store.

Here, the electronic apparatus according to some example embodiments may use information representing whether the specific application is installed in the user terminal included in the first information. That is, the address information for the landing page according to some example embodiments may be variably generated according to whether the specific application is installed. For example, when the electronic apparatus confirms that the specific application is not installed in the user terminal based on the first information, the address information for the landing page according to some example embodiments may provide the address information for the landing page running on the web platform to the user or the application store, in which an application may be installed, may be run on the user terminal device.

For example, when the corresponding landing page is set to run on a third platform, the electronic apparatus according to some example embodiments may provide a landing page representing an application platform or a web platform to a user terminal device. For example, when the specific application is installed in the user terminal device, the electronic apparatus may provide the user with the landing page running on the platform for the specific application. For example, when the specific application is not installed in the user terminal device, the electronic apparatus may provide the user with the landing page running on the specific web platform.

The second area 702 according to some example embodiments may further include an eighth interface 702c for setting a key of a page that may identify a landing page, a ninth interface 702d for setting whether the key of the page is transmitted to the address information for the landing page as a parameter, and a tenth interface 702e for setting whether the template address information according to some example embodiments for generating the address for the landing page is a dynamic type or a fixed type.

The ninth interface 702d according to some example embodiments is a setting related to the use of the parameter(s) and is an interface for setting the parameter to be included as a part for transmitting a query within address information for the landing page according to some example embodiments (e.g. as arguments or variables). The ninth interface 702d may be referred to as a use parameter interface.

Figure 8:
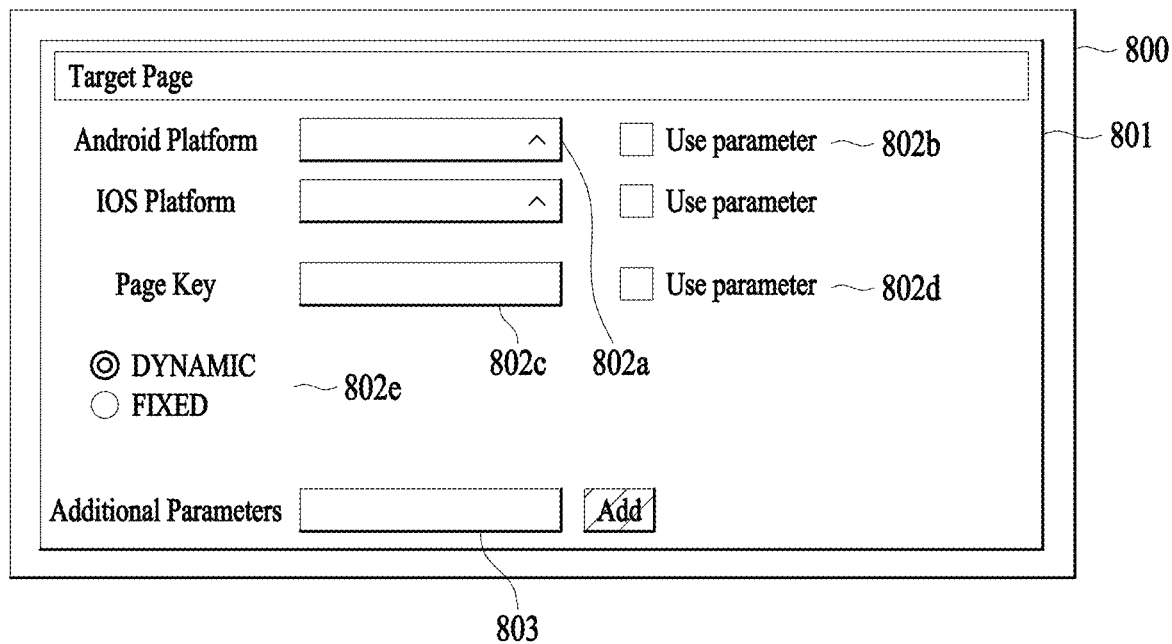
FIG. 8 is a diagram illustrating an example of a UI of a second page for setting details of a landing page according to example embodiments.

FIG. 8 is a diagram illustrating an example of a UI of a second page for setting details of a landing page according to example embodiments.

Referring to FIG. 8, a second page 800 includes a second area 801 according to some example embodiments. The second page 800 according to some example embodiments illustrated in FIG. 8 may mean a second page illustrated in FIGS. 6 and 7. A second area 801 according to some example embodiments illustrated in FIG. 8 means the second area 702 of FIG. 7. The second page 800 according to some example embodiments may include sixth to tenth interfaces 802a, 802b, 802c, 802d, and 802e according to some example embodiments illustrated in FIG. 7.

The second page 800 according to some example embodiments may further include an eleventh interface 803 for setting a parameter included in address information for a landing page according to some example embodiments. For example, when parameters are set by the eleventh interface 803 of the second page 800 according to some example embodiments, the electronic apparatus according to some example embodiments extracts parameters set by the eleventh interface 803 in the template address information and then substituted with values of the parameters included in the second information according to some example embodiments.

FIG. 9 is a diagram illustrating an example of a UI of a second page for setting details of a landing page according to example embodiments.

Specifically, FIG. 9 illustrates an example of a UI for setting template address information of a fixed type for setting a landing page. A second page 900 according to some example embodiments may include at least one of a first area and a second area illustrated in FIGS. 7 and 8.

Referring to FIG. 9, when template address information for a landing page is set to be fixed, the second page 900 according to some example embodiments is a third area 901 for bibliographically setting the fixed template address information and a fourth area 902 for setting details of fixed template address information.

The third area 901 may include an interface for setting a name of the fixed template address information, an interface for setting a type of fixed template address information, an interface for setting a description for fixed template address information, and the like.

The fourth area 902 is an area for setting details of the fixed template address information according to example embodiments. The fourth area 902 may include one or more interfaces for receiving a template address for generating landing address information for each platform. The platform according to some example embodiments may include a first platform representing a web platform, a second platform representing an application platform or an application store, a third platform representing an application platform or a web platform, or the like.

FIG. 10 is a diagram illustrating an example of a UI of a second page for setting details of a landing page according to example embodiments.

Specifically, FIG. 10 illustrates an example of a UI for setting template address information of a dynamic type for setting a landing page. A second page 1000 according to some example embodiments may include at least one of a first area and a second area illustrated in FIGS. 7 to 9.

Referring to FIG. 10, the second page 1000 according to some example embodiments may include a fifth area 1001 for bibliographically setting dynamic template address information, a sixth area 1002 for setting parameters for generating address information for the landing page, and a seventh area 1003 for setting details of the dynamic template address information.

The fifth area 1001 according to some example embodiments may include an interface for setting a name of the fixed template address information, an interface for setting a type of fixed template address information, an interface for setting a description for the fixed template address information, and the like.

The fifth area 1001 according to some example embodiments may further include a twelfth interface 1001a for setting a page key and a thirteenth interface 1001b for setting a data type of the page key.

The sixth area 1002 according to some example embodiments is an area for setting parameters for generating address information for the landing page. A parameter set in the sixth area may refer to a parameter included in the address for the landing page according to some example embodiments.

The electronic apparatus according to some example embodiments may search for positions of parameters set in the sixth area 1002 in the template address information according to some example embodiments. The electronic apparatus according to some example embodiments may map or substitute corresponding parameters included in the second information to the retrieved positions. The sixth area 1002 according to some example embodiments may further include an interface for setting a data type of each parameter (or types of values), an interface for deleting each parameter, and an interface for adding a setting of a new parameter.

The seventh area 1003 according to some example embodiments is an area for setting template address information of a dynamic type according to some example embodiments. The seventh area 1003 may include one or more interfaces for receiving a template address for generating landing address information for each platform. The platform according to some example embodiments may include a first platform representing a web platform, a second platform representing an application platform or an application store, a third platform representing an application platform or a web platform, or the like.

Meanwhile, some example embodiments of the present disclosure have been disclosed in the present specification and drawings, and although specific terms are used, these are merely used in a general sense to easily describe the technical content of the present disclosure and to aid understanding of the present disclosure but are not intended to limit the scope of the present disclosure. It is obvious to those of ordinary skill in the art to which the present disclosure pertains that other modifications based on the technical idea of the present disclosure can be implemented in addition to some example embodiments disclosed herein.

The electronic apparatus or terminal according to the above-described example embodiments may include a processor, a memory that stores and executes program data, a permanent storage such as a disk drive, a communication port for communication with an external device, a touch panel, a key, a user interface device such as a button, and the like. Methods implemented as software modules or algorithms may be stored on a computer-readable recording medium as computer-readable code or program instructions executable on the processor. Here, examples of the computer-readable recording medium may include magnetic storage media (for example, a read-only memory (ROM), a random-access memory (RAM), a floppy disk, a hard disk, etc.), optical reading media (for example, a compact disk (CD)-ROM or a digital versatile disc (DVD)), and the like. The computer-readable recording medium may be distributed in computer systems connected to each other through a network, and as a result, the computer-readable code may be stored and executed in a distributed manner. The medium may be readable by a computer, stored in a memory, and executed on a processor.

The present example embodiment may be represented by functional block configurations and various processing operations. These functional blocks may be implemented by various numbers of hardware and/or software components that execute specific functions. For example, some example embodiment may employ integrated circuit configurations, such as a memory, processing, logic, and a look-up table, capable of executing various functions by control of one or more microprocessors or other control devices. Similar to executing the components with software programming or software elements, the present example embodiment can be implemented with programming or scripting languages such as C, C++, Java, Assembly, and Python including various algorithms implemented by a combination of data structures, processes, routines or other programming configurations. Functional aspects may be implemented with algorithms executed on one or more processors. In addition, the present example embodiment may employ a conventional technology for electronic environment setting, signal processing, and/or data processing, and the like. Terms such as "mechanism," "element," "means," and "configuration" may be used broadly and are not limited to mechanical and physical configurations. The terms may include the meaning of a series of routines of software in connection with a processor or the like.

The above-described example embodiments are merely examples, and other example embodiments may be implemented within the scope of the following claims.

Meanwhile, some example embodiments of the present disclosure have been disclosed in the present specification and drawings, and although specific terms are used, these are merely used in a general sense to easily describe the technical content of the present disclosure and to aid understanding of the present disclosure but is not intended to limit the scope of the present disclosure. It is obvious to those of ordinary skill in the art to which the present disclosure pertains that other modifications based on the technical idea of the present disclosure can be implemented in addition to some example embodiments disclosed herein.

What is claimed is:

1. A method of managing a landing page by an electronic apparatus, the method comprising:
    acquiring first information on a user terminal and second information on a landing page in response to a request for accessing the landing page from the user terminal, wherein the second information comprises a parameter including an identifier associated with a content on the landing page;
    obtaining, based on the first information and the second information, a dynamic target address template associated with the landing page, wherein the dynamic target address template includes a mapping identifier;
    confirming an area in the dynamic target address template that the parameter to be mapped on, based on the mapping identifier;
    generating a uniform resource locator (URL) for the landing page, by mapping the parameter on the area in the dynamic target address template; and
    providing the landing page to the user terminal based on the URL that is variably generated according to the first information and the second information.

2. The method of claim 1, wherein the first information comprises information on an operating system of the user terminal, and
    the URL is variably generated according to the operating system of the user terminal.

3. The method of claim 2, wherein the generating comprises:
    confirming the information on the operating system;
    confirming a platform corresponding to the operation system of the user terminal; and
    generating the URL for the landing page corresponding to the confirmed platform.

4. The method of claim 3, wherein the obtaining the dynamic target address template further comprises:
    confirming the dynamic target address template corresponding to the confirmed platform; and
    generating the URL for the landing page according to a format of the dynamic target address template.

5. The method of claim 3, wherein the platform is one of a first platform representing a web platform, a second platform representing an application platform or an application store, or a third platform representing an application platform or a web platform.

6. The method of claim 1, wherein the first information comprises information representing whether a specific application is installed in the user terminal, and the URL is variably generated according to whether the specific application is installed.

7. The method of claim 1, wherein, when a setting related to a use of the parameter is enabled, the URL comprises a value of the parameter and a name of the parameter.

8. The method of claim 1, further comprising:
    collecting an action of the user terminal accessing the landing page based on the first information and the second information; and
    providing information on the collected action according to a preset criterion.

9. An electronic apparatus for managing a landing page, the electronic apparatus comprising:
    a memory in which at least one program is stored; and
    a processor configured to execute the at least one program to:
    obtain first information on a user terminal and second information on a landing page in response to a request for accessing the landing page from the user terminal, wherein the second information comprises a parameter including an identifier associated with a content on the landing page;

obtain, based on the first information and the second information, a dynamic target address template associated with the landing page, wherein the dynamic target address template includes a mapping identifier;

confirm an area in the dynamic target address template that the parameter to be mapped on, based on the mapping identifier;

generate a uniform resource locator (URL) for the landing page, by mapping the parameter on the area in the dynamic target address template; and provide the landing page to the user terminal based on the URL that is variably generated according to the first information and the second information.

10. A non-transitory computer-readable storage medium comprising a medium configured to store computer-readable instructions, wherein when the computer-readable instructions are executed by a processor, the processor is configured to perform:

acquiring first information on a user terminal and second information on a landing page in response to a request for accessing the landing page from the user terminal, wherein the second information comprises a parameter including an identifier associated with a content on the landing page;

obtaining, based on the first information and the second information, a dynamic target address template associated with the landing page, wherein the dynamic target address template includes a mapping identifier;

confirming an area in the dynamic target address template that the parameter to be mapped on, based on the mapping identifier;

generating an uniform resource locator (URL) for the landing page, by mapping the parameter on the area in the dynamic target address template; and providing the landing page to the user terminal based on the URL that is variably generated according to the first information and the second information.

\* \* \* \* \*